(12) United States Patent
Rosman

(10) Patent No.: US 7,555,593 B1
(45) Date of Patent: Jun. 30, 2009

(54) SIMULTANEOUS MULTI-THREADING IN A CONTENT ADDRESSABLE MEMORY

(75) Inventor: Andrew Rosman, Palo Alto, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 508 days.

(21) Appl. No.: 11/344,788

(22) Filed: Jan. 31, 2006

(51) Int. Cl.
*G06F 13/10* (2006.01)
*H04L 12/56* (2006.01)

(52) U.S. Cl. .................................. 711/108; 370/392
(58) Field of Classification Search ................... None
See application file for complete search history.

(56) References Cited

U.S. PATENT DOCUMENTS 6,792,502 B1 * 9/2004 Pandya et al. .............. 711/108

2006/0126628 A1 * 6/2006 Li et al. ..................... 370/392

* cited by examiner

*Primary Examiner*—Hyung S Sough
*Assistant Examiner*—Duc T Doan
(74) *Attorney, Agent, or Firm*—Shemwell Mahamedi LLP; William L. Paradice, III

(57) ABSTRACT

A CAM device having two execution pipelines includes control logic and a CAM core. The CAM core includes a plurality of independently searchable CAM arrays for storing CAM words. The control logic receives a first request that selects any number of the CAM arrays for a first compare operation, and receives a second request that selects any number of the CAM arrays for a second, separate compare operation. The control logic determines whether the same CAM array is selected by both requests. If not, the control logic schedules the first and second compare operations to be executed simultaneously in the CAM core. Otherwise, the control logic schedules the first and second compare operations for sequential execution uses a suitable arbitration technique to determine the order in which the first and second compare operations will be executed in the CAM core.

17 Claims, 8 Drawing Sheets

SIMULTANEOUS MULTI-THREADING IN A CONTENT ADDRESSABLE MEMORY

CROSS-REFERENCE TO RELATED APPLICATION

The present application is related to co-pending and commonly owned U.S. patent application Ser. No. 11/298,206 entitled "Re-Entrant Processing in a Content Addressable Memory" and filed on Dec. 8, 2005, the entirety of which is incorporated by reference herein.

FIELD OF INVENTION

The present invention relates generally to content addressable memories, and more specifically to the throughput of a content addressable memory in a network processing environment.

DESCRIPTION OF RELATED ART

A content addressable memory (CAM) device is a storage device having an array of memory cells that can be instructed to compare the specific pattern of a search key (also referred to as comparand data or a comparand word) with data words stored in rows of the array. The entire CAM array, or segments thereof, may be searched in parallel for a match with the comparand data. If a match exists, the CAM device indicates the match condition by asserting a match flag, and may indicate the existence of multiple matches by asserting a multiple match flag. The CAM device typically includes a priority encoder that determines the highest priority matching address (e.g., the lowest matching CAM index). The highest priority matching address (HPM), the contents of the matched location, and other status information (e.g., skip bit, empty bit, full flag, as well as match and multiple match flags) may be output from the CAM device to an output bus. In addition, associative data may be read out from an associated memory device such as DRAM in response to the HPM.

CAM devices are often used in network switching and routing applications to determine forwarding destinations for packets, and may also be used for quality of service (QoS) enforcement, packet classification, policy-based routing, and so on. For example, FIG. 1A shows a network processing system 100A having a network processor 110 and a CAM system 120 including a CAM device 121 and an associated memory device 123. Network processor 110, which is well-known, includes a network port 111 coupled to the physical or media access controller (PHY/MAC) layer of an associated network such as the Internet (not shown for simplicity), and includes a CAM port 112 coupled to CAM system 120 via signal lines 101 and the CAM device's I/O port 124. CAM device 121, which is well-known, includes a CAM core 122 having an array of CAM cells (not shown for simplicity) for storing a plurality of data words. Memory device 123, which is well-known, is connected to CAM device 121 via signal lines 102 and includes an array of memory cells such as DRAM cells for storing associated data for CAM device 121. For example, in some applications, the array of CAM cells in CAM device 121 may store destination (e.g., next-hop) addresses, and the array of DRAM cells in memory device 123 may store other routing information (e.g., such as policy statements, Quality of Service (QoS) parameters, allowable bandwidth parameters, and so on) associated with the destination addresses.

In operation, network processor 110 receives a packet having a header and a payload from the PHY/MAC layer. The payload typically includes data to be routed across the network, and the header typically includes a source address, a destination address, and other routing information. Typically, network processor 110 stores the payload, extracts the destination address from the header, and generates a search key (KEY) from the destination address. Then, network processor 110 provides KEY and an instruction (INST) to CAM system 120. The instruction is decoded in CAM device 121 to initiate a well-known compare operation between KEY and the data words stored in the CAM core's array. If there is a match, CAM core 122 outputs the index (IDX) of the highest priority matching location to memory device 123, which uses IDX as an address to retrieve associated data (DOUT) for the packet for output to network processor 110.

Some more recent network processors are capable of communicating with a CAM system using two or more separate communication channels, for example, so that one channel may be utilized by one user and another channel may be used by another user. For example, FIG. 1B shows a network processing system 100B including network processor 110 coupled to CAM system 120 via two independent channels. The first CAM port 112A of network processor 110 is coupled to a first I/O port 124A of CAM system 120 via signal lines 103A, and the second CAM port 112B of network processor 110 is coupled to a second I/O port 124B of CAM system 120 via signal lines 103B. The first channel 103A provides a first instruction (INST_A) and a first search key (KEY_A) from network processor 110 to CAM system 120 to compare KEY_A with data stored in the CAM core to generate IDX_A, which in turn may be used to retrieve associated data DOUT_A from associated memory device 123. IDX_A and DOUT_A may be returned to network processor 110 via signal lines 103A. The second channel 103B provides a second instruction (INST_B) and a second search key (KEY_B) from network processor 110 to CAM system 120 to compare KEY_B with data stored in the CAM core to generate IDX_B, which in turn may be used to retrieve associated data DOUT_B from associated memory device 123. IDX_B and DOUT_B may be returned to network processor 110 via signal lines 103B.

Some architectures of CAM core 122 include two execution pipelines that are able to individually access any portion of the core's CAM array for compare operations associated with KEY_A and KEY_B, respectively. For such devices, the compare operations associated with KEY_A and KEY_B are typically processed in the CAM core 122 in a sequential manner because the core's CAM array can perform only one search operation on data stored therein at a time. Thus, although the processing system of FIG. 1B includes two separate channels for processing two independent packet threads, the sequential nature in which the threads are processed through the CAM core 122 results in the total bandwidth of the two channels (103A-103B) of processing system 110B of FIG. 1B being the same as the bandwidth of the single channel 101 of processing system 110A of FIG. 1A.

Other architectures of CAM core 122 having two execution pipelines include a CAM array that is partitioned into first and second portions, where the first portion is dedicated to one pipeline and the second portion is dedicated to the other pipeline. Although allowing compare operations associated with KEY_A and KEY_B to be executed simultaneously in their respective CAM array portions, such architectures undesirably limit flexibility because each pipeline has access to only a dedicated portion of the CAM array.

Accordingly, it would be desirable to improve the bandwidth of CAM devices having multiple channel input/output interfaces over prior CAM devices having only one channel input/output interface without limiting flexibility.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Embodiments of the present invention are described below with respect to an exemplary network processing system for simplicity only. It is to be understood that embodiments of the present invention may be implemented in other systems, and are equally applicable to CAM architectures other than the exemplary CAM architectures described herein. For example, although described below in the context of a dual-pipeline CAM device, embodiments of the present invention are equally applicable for implementing any suitable number of pipelines in a CAM device. In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be a bus. Additionally, the logic states of various signals described herein are exemplary and therefore may be reversed or otherwise modified as generally known in the art.

Embodiments of the present invention may improve the bandwidth of a multi-pipelined CAM device by selectively enabling the simultaneous execution of multiple compare operations in the CAM device. The CAM device, which may have any suitable number of pipelines, includes control logic and a CAM core. The CAM core includes a plurality of independently operable CAM blocks, wherein each CAM block includes an array of CAM cells for storing a plurality of data words that may be compared with a search key during a corresponding search operation. The control logic receives a plurality of requests each selecting one or more of the CAM arrays to participate in a corresponding compare operation with an associated search key, and schedules the compare operations for execution in the CAM core in a manner that maximizes through-put of the CAM device. For some embodiments, the control logic determines whether any of the compare operations may be performed simultaneously in the CAM core, and if so, schedules them for simultaneous execution in the CAM core. Conversely, for those compare operations that cannot be performed simultaneously, the control logic schedules them for sequential execution in the CAM core according to a selected arbitration scheme.

Figure 1A:
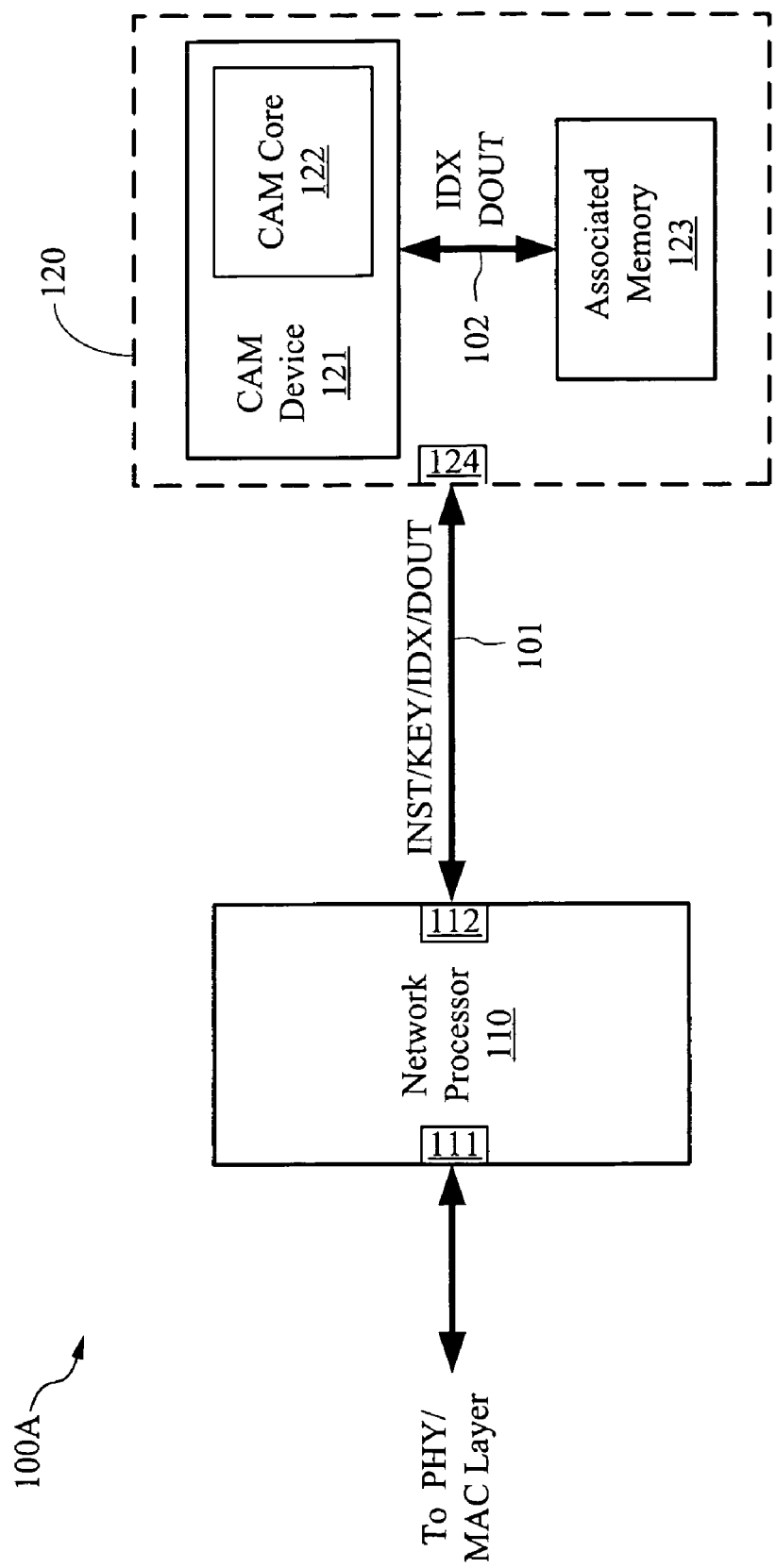
FIG. 1A is a block diagram of a signal-channel network processing system.
Figure 1B:
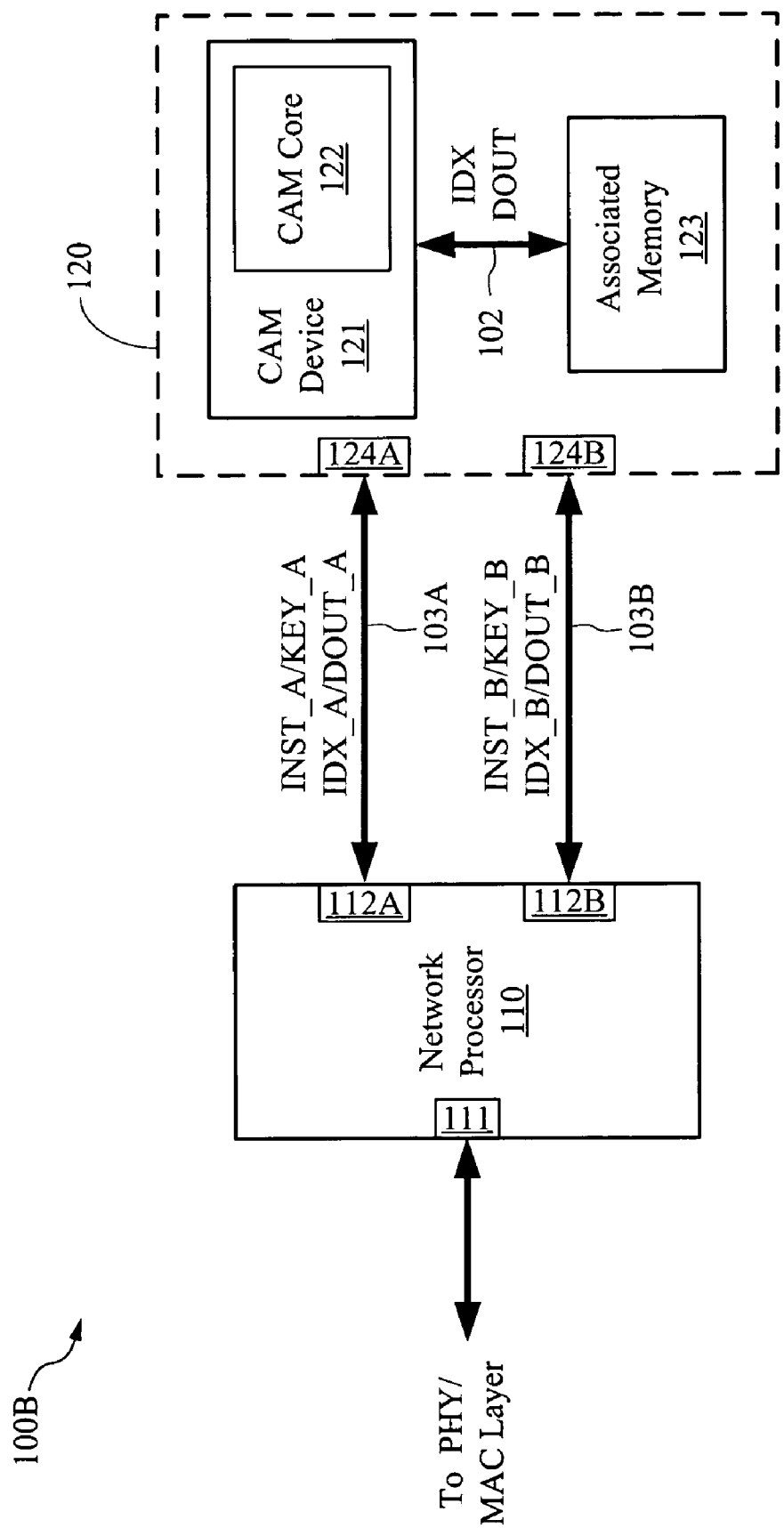
FIG. 1B is a block diagram of a dual-channel network processing system.
Figure 2A:
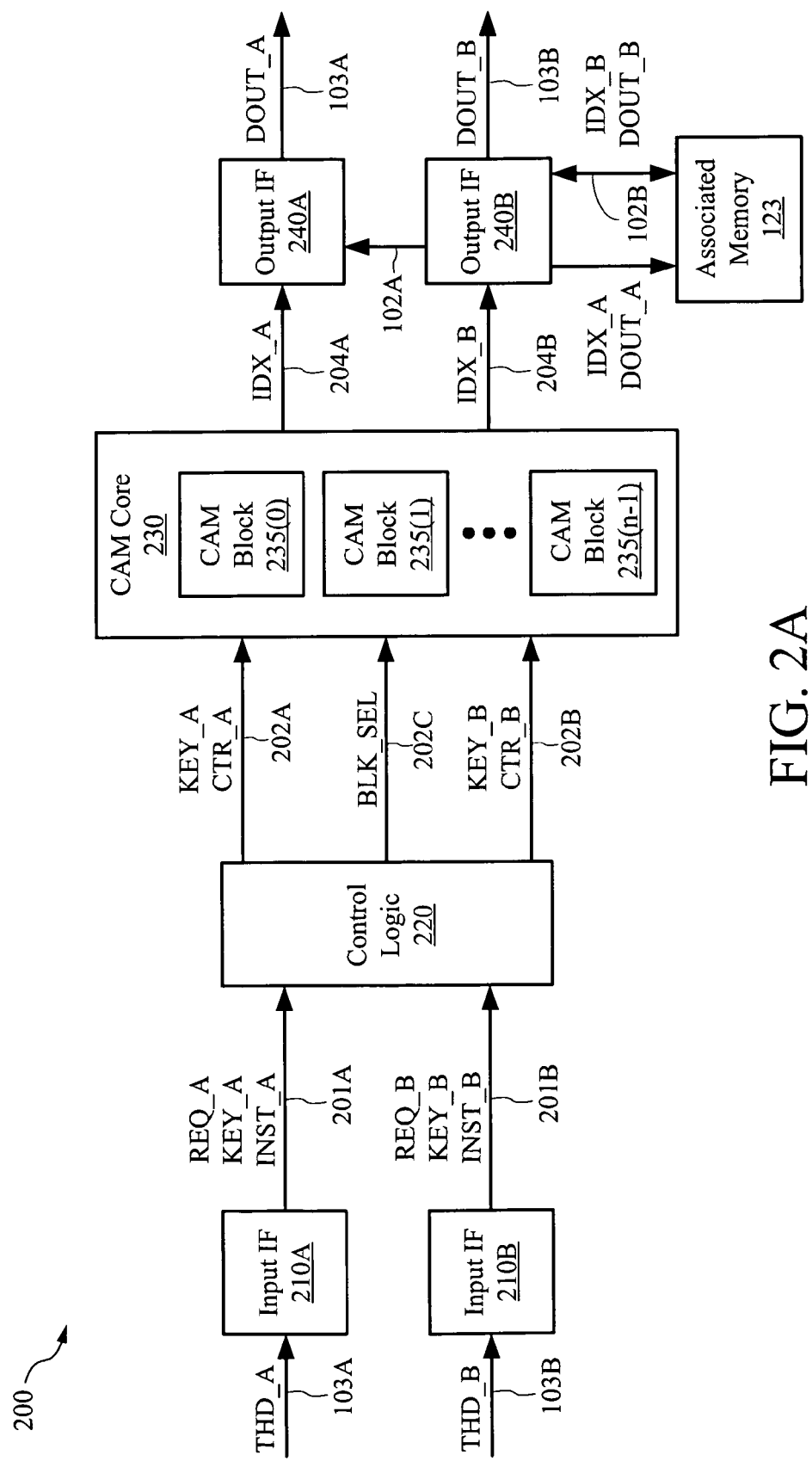
FIG. 2A is a simplified functional block diagram of a CAM device in accordance with some embodiments of the present invention.

FIG. 2A shows an exemplary embodiment of a CAM device 200 in accordance with some embodiments of the present invention. For exemplary purposes of discussion herein, CAM device 200 is described below as replacing CAM device 121 in the exemplary network processing system 100B of FIG. 1B. However, for other embodiments, CAM device 200 may be employed in other processing systems. CAM device 200 is shown to include well-known input interfaces 210A-210B, control logic 220, a CAM core 230, and well-known output interfaces 240A-240B. CAM core 230 includes a plurality of CAM blocks 235(0)-235(n-1), each of which includes an array of CAM cells (not shown in FIG. 2A for simplicity) for storing a number of CAM words. The CAM arrays within corresponding CAM blocks 235 may store any suitable data, and may store different types of data. For example, for some embodiments, a first set of the CAM arrays may store destination addresses for next-hop routing functions, a second set of the CAM arrays may store quality of service (QoS) information for packet routing, a third set of the CAM arrays may store policy information for packet routing, and so on.

In accordance with some embodiments of the present invention, the CAM blocks 235 are independently operable, and each of their associated CAM arrays is individually searchable (e.g., using a search key to generate match results such as IDX). Thus, for example, a first compare operation between a first search key and data words stored in the CAM array within CAM block 235(0) may be performed simultaneously with and independently of a second compare operation between a second search key and data words stored in the CAM array within CAM block 235(1). Further, each of the CAM arrays in CAM blocks 235(0)-235(n-1) may be independently selected for any number of compare operations. In this manner, multiple compare operations may select the same CAM array for participation in generating match results (e.g., IDX) for a corresponding number of search keys. However, because each CAM array can compare only one search key with data stored therein at a time, multiple compare operations that select the same CAM array for participation in generating match results are executed in a sequential manner.

For each compare operation performed in CAM core 230, if there is a match between KEY and data stored in the CAM arrays selected for participation in the compare operation, CAM core 230 outputs an index (IDX) of the highest priority match in the selected CAM arrays to a corresponding output interface 240, which may use IDX to retrieve associated data (DOUT) from associated memory 123 via signal lines 102 for output to network processor 110 via signal lines 103.

Referring also to FIG. 1B, first input interface 210A includes an input to receive one or more first threads (THD_A) from the first CAM port 112A of network processor 110 via signal lines 103A, and includes an output coupled to a first input of control logic 220 via signal lines 201A. Second input interface 210B includes an input to receive one or more second threads (THD_B) from the second CAM port 112B of network processor 110 via signal lines 103B, and includes an output coupled to a second input of control logic 220 via signal lines 201B.

Control logic 220 receives a first request (REQ_A), a first search key (KEY_A), and a first instruction (INST_A) associated with THD_A from first input interface 210A via lines 201A, and receives a second request (REQ_B), a second search key (KEY_B), and a second instruction (INST_B) associated with THD_B from second input interface 210B via lines 201B. Although not shown in FIG. 2A for simplicity, control logic 220 may include one or more instruction decoders that decode INST_A to generate control signals CTR_A and that decode INST_B to generate control signals CTR_B, where CTR_A initiates one compare operation between KEY_A and data stored in one or more CAM blocks 235 selected by REQ_A, and CTR_B initiates another compare operation between KEY_B and data stored in one or more CAM blocks 235 selected by REQ_B. Control logic 220 provides CTR_A and KEY_A to a first pipeline of CAM core 230 via signal lines 202A, and provides CTR_B and KEY_B to a second pipeline of CAM core 230 via signal lines 202B.

Control logic 220 also includes an output to generate a block select (BLK_SEL) signal that instructs CAM core 230 which CAM blocks 235 are to participate in each compare operation. For some embodiments, the first request (REQ_A) associated with THD_A selects one or more of CAM blocks 235(0)-235(n−1) to participate in the compare operation with KEY_A, and the second request (REQ_B) associated with THD_B selects one or more of CAM blocks 235(0)-235(n−1) to participate in the compare operation with KEY_B. REQ_A and REQ_B may each select, independently of one another, any of the CAM arrays within CAM blocks 235(0)-235(n−1) to participate in the respective compare operation with KEY_A and KEY_B. Thus, for some embodiments, control logic 220 includes well-known circuitry (not shown for simplicity) that compares REQ_A with REQ_B to determine whether REQ_A and REQ_B select any of the same CAM arrays for their respective compare operations, and in response thereto, determines whether the two compare operations may be executed simultaneously in CAM core 230.

More specifically, because each CAM array is capable of comparing only one search key to data stored therein at a time, if REQ_A and REQ_B select one or more of the same CAM arrays to participate in their respective compare operations, then the compare operations associated with REQ_A and REQ_B are scheduled for sequential execution in CAM core 230 in an order determined by control logic 220. For each sequentially scheduled compare operation, control logic 220 generates a value of BLK_SEL that causes the search key (KEY) and the control signals (CTR) to be routed only to those CAM blocks 235 selected by the corresponding request.

Conversely, if REQ_A and REQ_B do not select any of the same CAM arrays for participation in their respective compare operations, then the first compare operation associated with REQ_A and the second compare operation associated with REQ_B may be executed simultaneously in CAM core 230. For the concurrent compare operations, control logic 220 generates a value of BLK_SEL that causes KEY_A and CTR_A to be routed only to the CAM blocks selected by REQ_A, and causes KEY_B and CTR_B to be routed only to the CAM blocks selected by REQ_B.

The ability to simultaneously perform multiple compare operations in CAM core 230 allows packets from multiple threads (e.g., THD_A and THD_B) to be simultaneously executed along parallel pipelines in the CAM device. The resulting thread-level parallelism achieved by the present invention may significantly improve the through-put of CAM device 200 over prior CAM devices that are capable of performing only one compare operation at a time, and may significantly increase flexibility over prior CAM architectures having each execution pipeline dedicated to a corresponding portion of the CAM array. Further, the total bandwidth of CAM device 200 may be optimized by maximizing the number of pairs of compare operations scheduled for simultaneous execution in CAM core 230. For example, for applications in which it is known that a first group of requests does not select any of the same CAM blocks selected by a second group of requests, corresponding requests of the first and second groups may be paired together to allow for their simultaneous execution in CAM core 230, thereby increasing the bandwidth of the CAM device.

When control logic 220 determines that multiple compare operations will not be simultaneously executed in CAM core 230, control logic 220 may utilize any suitable arbitration technique to determine the order in which the compare operations will be executed in CAM core 230. For one embodiment, control logic 220 may use a well-known round-robin scheme that alternately selects compare operations associated with the first and second threads (THD_A and THD_B) for sequential execution by CAM core 230. For other embodiments, control logic 220 may examine the bandwidth characteristics for input interfaces 210A-210B to develop a heuristic measure of each thread's bandwidth consumption that, in turn, may be used to dynamically alter the scheduling of compare operations associated with the first and second threads to achieve a desired bandwidth allocation relationship between the first and second threads. Of course, for other embodiments, other suitable arbitration techniques may be employed.

As mentioned above, CAM core 230 generates a first index (IDX_A) in response to a first compare operation between KEY_A and data stored in CAM blocks 235 selected by REQ_A, and generates a second index (IDX_B) in response to a second compare operation between KEY_B and data stored in CAM blocks 235 selected by REQ_B. Output interface 240A may use IDX_A as an address to retrieve first data (DOUT_A) from associated memory 123, and may output DOUT_A to network processor 110 via signal lines 103A. Output interface 240B may use IDX_B as an address to retrieve second data (DOUT_B) from associated memory 123, and may output DOUT_B to network processor 110 via signal lines 103B. Output interfaces 240A and 240B may be implemented using well-known circuit techniques.

As described above, for some embodiments, the first request (REQ_A) associated with THD_A selects one or more of CAM blocks 235(0)-235(n−1) to participate in the compare operation with KEY_A, and the second request (REQ_B) associated with THD_B selects one or more of CAM blocks 235(0)-235(n−1) to participate in the compare operation with KEY_B. For such embodiments, REQ_A and REQ_B each may include a block select (BS) bit set that identifies which of CAM block 235(0)-235(n−1) are to participate in its corresponding compare operation(s). For some embodiments, a logic "1" BS bit indicates that a corresponding CAM block 235 is selected to participate in the compare operation, and a logic "0" BS bit indicates that the corresponding CAM block 235 is not selected to participate in the compare operation.

For example, for an exemplary embodiment in which CAM core 230 includes 8 CAM blocks 235(0)-235(7), a bit set BS(0)=00000011 indicates that a group consisting of CAM blocks 235(0)-235(1) is selected for participating in the corresponding compare operation, a bit set BS(1)=00001100 indicates that a group consisting of CAM blocks 235(2)-235(3) is selected for participating in the corresponding compare operation, and a bit set BS(2) for =00000110 indicates that a group consisting of CAM blocks 235(1)-235(2) is selected for participating in the corresponding compare operation. Thus, if REQ_A includes BS(0)=00000011 and REQ_B includes BS(1)=00001100, which indicates that CAM blocks 235(0) and 235(1) are selected for comparison with KEY_A and that CAM blocks 235(2) and 235(3) are selected for comparison with KEY_B, respectively, then the separate compare operations associated with KEY_A and KEY_B may be executed simultaneously in the CAM core because REQ_A and REQ_B do not select any of the same arrays within CAM blocks 235. However, if REQ_A includes BS(0) =00000011 and REQ_B includes BS(2)=00000110, which indicates that CAM blocks 235(0) and 235(1) are selected for comparison with KEY_A and that CAM blocks 235(1) and 235(2) are selected for comparison with KEY_B, respectively, then the separate compare operations associated with KEY_A and KEY_B are executed sequentially in CAM core 230 because both REQ_A and REQ_B select CAM block 235(1) to participate in their respective compare operations.

Figure 2B:
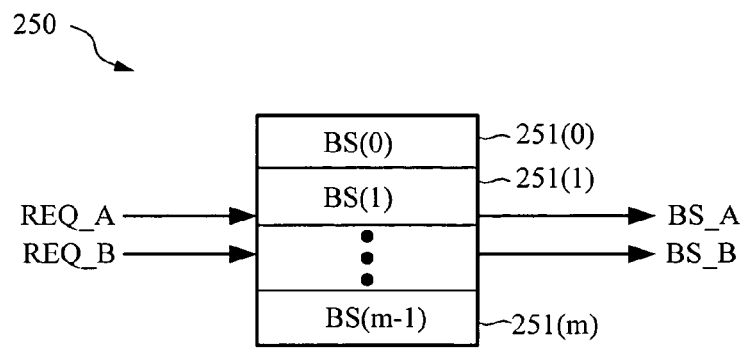
FIG. 2B is a block diagram of a block select look-up table that may be employed in some embodiments of the CAM device of FIG. 2A.

For other embodiments, REQ_A and REQ_B may be pointers or address values that retrieve one of a plurality of block select bit sets from a suitable look-up table (LUT). For example, FIG. 2B shows a LUT 250 having a plurality of storage locations 251(0)-251 (m−1) for storing a plurality of block select bit sets BS(0)-BS($m^{-1}$), respectively. Each of block select bit sets BS(0)-BS($m^{-1}$) may select any number of CAM blocks 235(0)-235(n−1) to participate in a corresponding compare operation. LUT 250 includes a first input to receive REQ_A, a second input to receive REQ_B, a first output to provide a block select bit set (BS_A) addressed by REQ_A, and a second output to provide a block select set (BS_B) addressed by REQ_B, where BS(A) and BS(B) are arbitrary block select bit sets stored in LUT 250. LUT 250 may be any suitable 2-port memory device capable of being independently addressed by REQ_A and REQ_B to retrieve block select bit sets BS(0)-BS(m−1). For some embodiments, LUT 250 may be included within control logic 220. For other embodiments, LUT 250 may be external to control logic 220.

Figure 3:
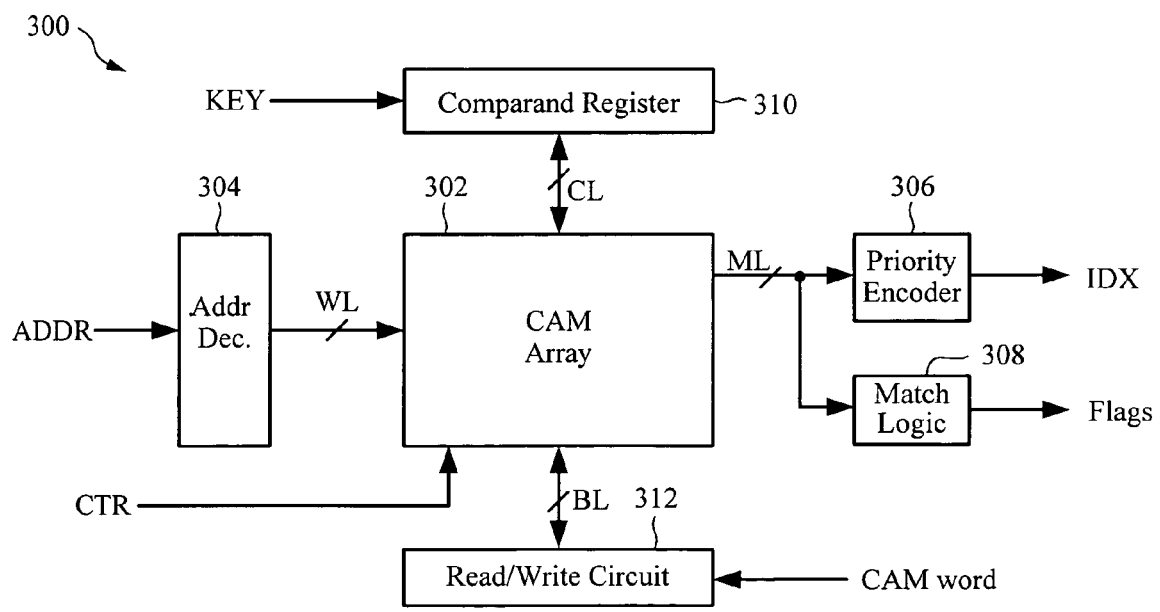
FIG. 3 is a functional block diagram of an exemplary embodiment of one of the CAM blocks of FIG. 2A.

FIG. 3 shows an exemplary CAM block 300 that is one embodiment of CAM blocks 235 of FIG. 2A. CAM block 300 includes a CAM array 302 that has any number of rows of CAM cells (not shown in FIG. 3 for simplicity). Each row of CAM cells may be used to store a corresponding data word. The CAM cells in CAM array 302 may be any suitable type of CAM cell such as, for example, synchronous CAM cells, asynchronous CAM cells, binary CAM cells, ternary CAM cells, and/or quaternary CAM cells. CAM array 302 can be of any suitable size and/or configuration, and for some embodiments may include inter-row configurability features that allow storage of data words of varying lengths (e.g., words that are stored in more than one row and/or data words that are stored in a portion of a row), for example, as described in commonly owned U.S. Pat. Nos. 6,799,243 and 6,934,795, the entireties of which are incorporated herein by reference. Although not shown in FIG. 3 for simplicity, CAM array 302 may be divided into a plurality of separate, individually selectable CAM blocks, for example, as described in commonly owned U.S. Pat. Nos. 6,324,087, 6,687,785, and 6,763, 425, the entireties of which are incorporated herein by reference.

Each row of CAM cells in CAM array 302 is coupled to an address decoder 304 via a corresponding word line (WL), and to a priority encoder 306 and to match logic 308 via a corresponding match line (ML). The word lines (WL) and match lines (ML) are represented collectively in FIG. 3 for simplicity. Address decoder 304 receives an address (ADDR) to select a row of CAM cells in CAM array 302 during read and write operations. The match lines provide match results for compare operations between the search key (KEY) and data stored in CAM array 302 to priority encoder 306, which in response thereto determines the matching entry that has the highest priority number associated with it and generates the index (IDX) or address of this highest priority match. Match logic 308 may generate a match flag to indicate a match condition, and may also generate a multiple match flag to indicate multiple matches.

Further, although not shown in FIG. 3 for simplicity, each row of CAM cells in array 302 may have one or more validity bits to indicate whether the corresponding row (or segment thereof) of CAM cells is in a valid state or an empty state. The validity bits may be provided to priority encoder 306 to generate the next free address (NFA) that is available in CAM array 302 for storing new data. The validity bits may also be provided to a well-known full flag logic circuit (not shown for simplicity) to generate a full flag and/or an empty flag for CAM array 302.

Each column of CAM cells in CAM array 302 is coupled to a well-known comparand register 310 via comparand lines (CL) and to a well-known read/write circuit 312 via bit lines (BL). Comparand register 310 provides the search key (KEY) to CAM array 302 for comparison with entries stored in CAM array 302. Read/write circuit 312 includes well-known write drivers and sense amplifiers, and includes an I/O port to receive/output a CAM word. Although not shown for simplicity, CAM block 300 may also include a global mask circuit that stores one or more mask patterns that selectively mask entries in CAM array 302 during compare operations with KEY.

Referring again to FIG. 2A, for other embodiments, CAM core 230 may be replaced by other well-known circuitry that is capable of implementing search operations associated with network routing applications. For example, for another embodiment, CAM core 230 may be replaced by circuitry configured to implement well-known hashing functions. Further, for some embodiments, CAM device 200 and associated memory 123 may be formed as separate IC chips. For other embodiments, CAM device 200 and associated memory 123 may be formed on the same IC chip.

Figure 4:
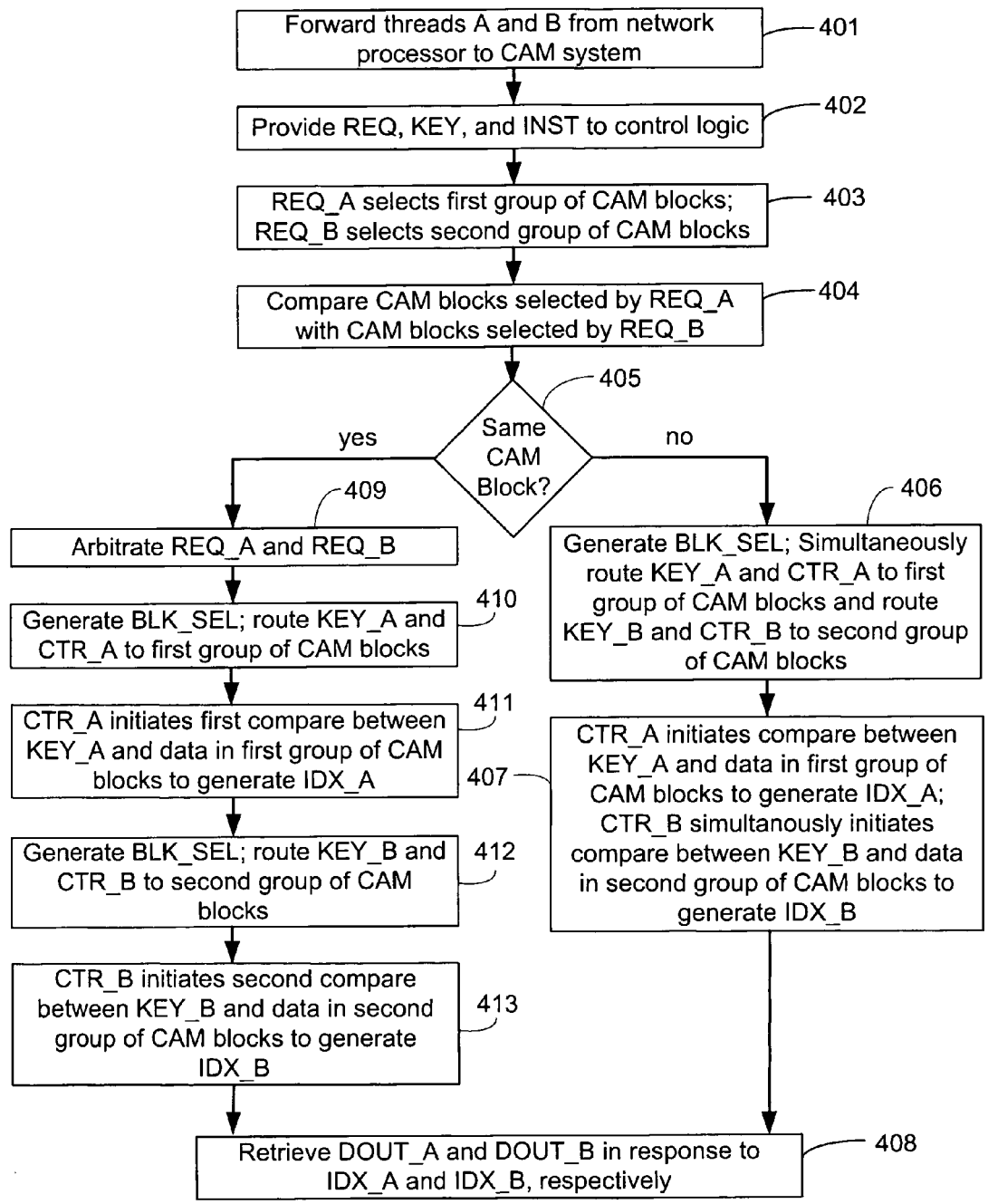
FIG. 4 is an illustrative flow chart depicting an exemplary operation of one embodiment of the CAM device of FIG. 2A.

An exemplary operation of CAM device 200 is described below with reference to the illustrative flow chart of FIG. 4. Referring also to FIG. 2A, the network processor 110 forwards first and second threads (THD_A and THD_B) to CAM device 200 via input interfaces 210A-210B, respectively (401). The first thread THD_A, which may correspond to a first packet having a payload buffered by network processor 110 and having a header containing a source address and a destination address, includes a first request (REQ_A), a first search key (KEY_A), and a first instruction (INST_A). The second thread THD_B, which may correspond to a second packet having a payload buffered by network processor 110 and having a header containing a source address and a destination address, includes a second request (REQ_B), a second search key (KEY_B), and a second instruction (INST_B).

First input interface 210A forwards REQ_A, KEY_A, and INST_A to the first input of control logic 220, and second input interface 210B forwards REQ_B, KEY_B, and INST_B to the second input of control logic 220 (402). REQ_A requests a first compare operation between KEY_A and data stored in the CAM array(s) within the CAM block(s) selected by REQ_A. Similarly, REQ_B requests a second compare operation between KEY_B and data stored in the CAM array(s) within the CAM block(s) selected by REQ_B (403). Next, control logic 220 compares the block select bit set of REQ_A with the block select bit set of REQ_B to determine whether the group of CAM blocks 235 selected by REQ_A includes any of the same CAM blocks 235 that are selected REQ_B (404).

If REQ_A and REQ_B do not select any of the same CAM blocks, as tested at 405, then control logic 220 simultaneously forwards CTR_A/KEY_A and CTR_B/KEY_B to CAM core 230, and generates a value of BLK_SEL that causes KEY_A/CTR_A to be routed to the CAM blocks 235 selected by REQ_A and causes KEY_B/CTR_B to be routed to the CAM blocks 235 selected by REQ_B for simultaneous execution (406). For some embodiments, control logic 220 may assert an enable signal (not shown in FIG. 2A for simplicity) to indicate that the two compare operations may be scheduled for simultaneous execution in CAM core 230. Next, CTR_A initiates a first compare operation between KEY_A and data stored in the CAM blocks 235 selected by REQ_A to generate IDX_A, and CTR_B simultaneously initiates a second compare operation between KEY_B and data stored in the CAM blocks 235 selected by REQ_B to generate IDX_B (407). Thereafter, IDX_A and IDX_B may be used to retrieve (e.g., simultaneously) associated data DOUT_A and DOUT_B, respectively, from associated memory device 123 (408).

Conversely, if REQ_A and REQ_B select one or more of the same CAM blocks 235, as tested at 405, then control logic 220 arbitrates REQ_A and REQ_B to determine the order in which their respective compare operations will be processed in CAM core 230 (409). For some embodiments, control logic 220 may de-assert an enable signal (not shown in FIG. 2A for simplicity) to indicate that the two compare operations are not scheduled for simultaneous execution in CAM core 230. As mentioned above, control logic 220 may use any suitable arbitration technique to determine the order in which the compare operations associated with REQ_A and REQ_B will be executed in CAM core 230. For the present example, control logic 220 schedules the compare operation requested by REQ_A for execution first, and schedules the compare operation requested by REQ_B to be executed second. Thus, for the present example, control logic 220 forwards CTR_A and KEY_A to CAM core 230, and generates a first value of BLK_SEL that causes KEY_A and CTR_A to be routed only to the CAM blocks 235 selected by REQ_A (410). Next, CTR_A initiates a first compare operation between KEY_A and data stored in the CAM blocks 235 selected by REQ_A to generate IDX_A (411). Then, control logic 220 forwards CTR_B and KEY_B to CAM core 230, and generates a second value of BLK_SEL that causes KEY_B and CTR_B to be routed only to the CAM blocks 235 selected by REQ_B (412). Next, CTR_B initiates a second compare operation between KEY_B and data stored in the CAM blocks 235 selected by REQ_B to generate IDX_B (413). Thereafter, IDX_A and IDX_B may be used to retrieve associated data DOUT_A and DOUT_B, respectively, from associated memory device 123 (408).

Figure 5:
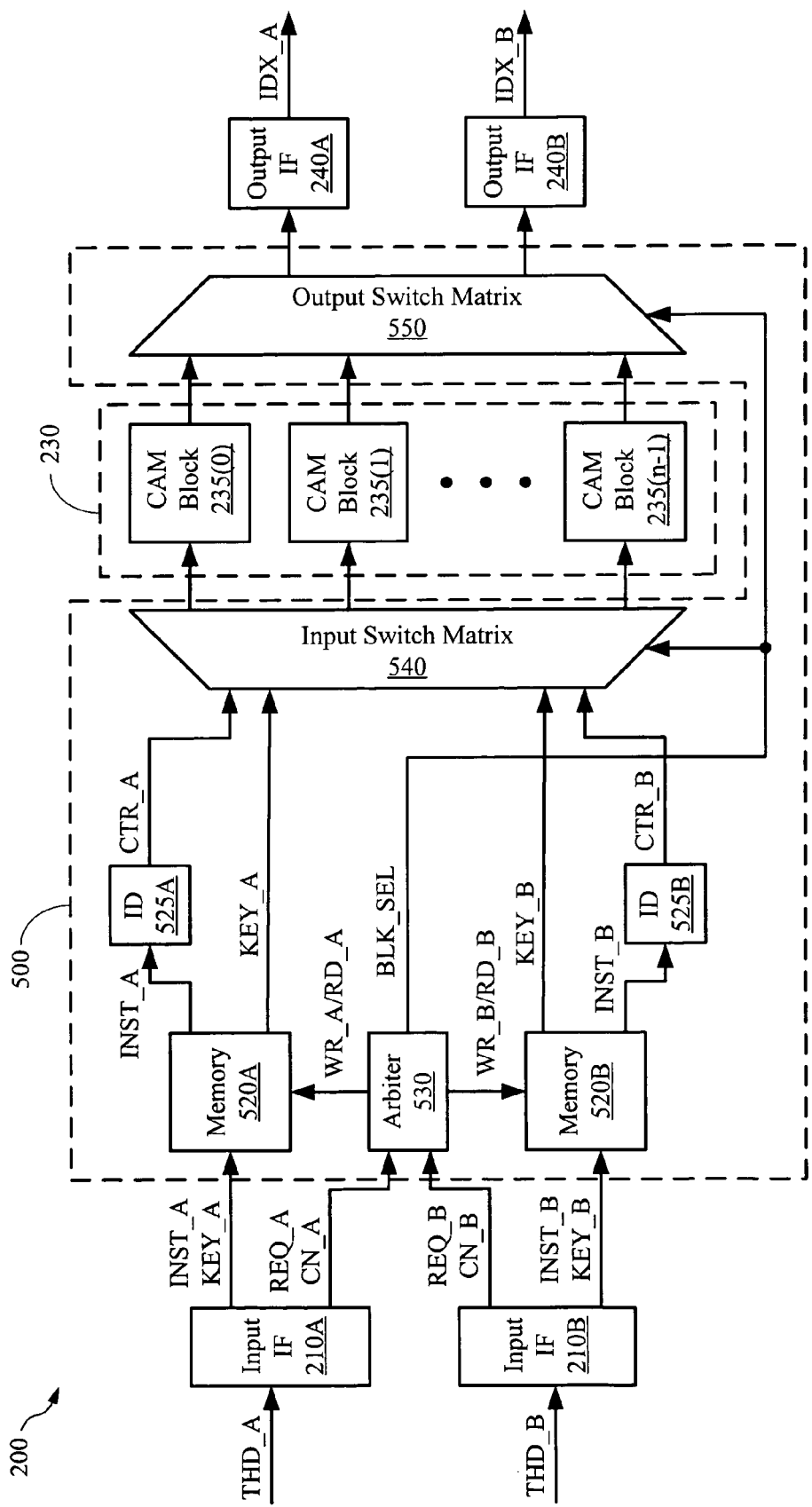
FIG. 5 shows a CAM device including a functional block diagram of one embodiment of the control logic of FIG. 2A.

FIG. 5 shows CAM device 200 including a functional block diagram of control logic 500 that is one embodiment of control logic 220 of FIG. 2A. Control logic 500 includes a first memory 520A, a second memory 520B, an arbiter 530, a first instruction decoder 525A, a second instruction decoder 525B, an input switch matrix 540, and an output switch matrix 550. For simplicity, associated memory device 123 is not shown in FIG. 5. Memory 520A, which includes an input coupled to input interface 210A, a control terminal coupled to arbiter 530, and outputs to provide INST_A and KEY_A, includes a plurality of storage locations for storing a number of pairs of INST_A and KEY_A for various context numbers (CN_A) associated with THD_A. Memory 520B, which includes an input coupled to input interface 210B, a control terminal coupled to arbiter 530, and outputs to provide INST_B and KEY_B, includes a plurality of storage locations for storing a number of pairs of INST_B and KEY_B for various context numbers (CN_B) associated with THD_B. Memories 520A-520B may include any suitable type of memory elements (e.g., SRAM or DRAM cells), and may be of any suitable architecture (e.g., RAM, FIFO, registers, and so on). For exemplary embodiments described herein, each memory 520A and 520B is a context buffer that stores KEY/INST pairs in storage locations identified by corresponding context numbers (CN) associated with input threads THD_A and THD_B, respectively.

Arbiter 530 includes inputs to receive REQ_A/CN_A and REQ_B/CN_B, a first output to provide write control signals WR_A and read control signals RD_A to memory 520A, a second output to provide write control signals WR_B and read control signals RD_B to memory 520B, and a third output to generate BLK_SEL. As mentioned above, arbiter 530 compares REQ_A with REQ_B to determine whether the compare operations requested by REQ_A and REQ_B may be executed simultaneously in CAM core 230. If so, arbiter 530 causes CTR_A and REQ_A to be routed to only those CAM blocks 235 selected by REQ_A, and simultaneously causes CTR_B and REQ_B to be routed to only those CAM blocks 235 selected by REQ_B so that the compare operations associated with REQ_A and REQ_B may be executed simultaneously in CAM core 230. Otherwise, arbiter 530 determines the order in which the compare operations associated with REQ_A and REQ_B are to be executed in CAM core 230, and causes CTR_A/KEY_A and CTR_B/KEY_B to be sequentially forwarded to the CAM blocks 235 selected by REQ_A and REQ_B, respectively. Arbiter 530 may use any suitable arbitration technique (e.g., such as fixed, round robin, weighed fair queuing, bandwidth allocation, and so on) to arbitrate REQ_A and REQ_B. For some embodiments, arbiter 530 may be configurable (e.g., by a network administrator or a user) to select one of a multitude of arbitration techniques to employ when arbitrating REQ_A and REQ_B.

Instruction decoder 525A, which is well-known, decodes INST_A to generate control signals (CTR_A) that initiate compare operations between KEY_A and data stored in the CAM arrays selected by REQ_A. Instruction decoder 525B, which is well-known, decodes INST_B to generate control signals (CTR_B) that initiate compare operations between KEY_B and data stored in the CAM arrays selected by REQ_B. The control signals CTR_A and CTR_B may also initiate other functions in CAM core 230, for example, such as read, write, and test operations.

Input switch matrix 540, which may be formed using well-known cross-bar circuits, multiplexers, and the like, includes first inputs to receive CTR_A and KEY_A, second inputs to receive CTR_B and KEY_B, a control terminal to receive BLK_SEL, and a plurality of outputs each coupled to a corresponding one of CAM blocks 235(0)-235(n−1). In response to BLK_SEL, input switch matrix 540 selectively routes CTR_A and KEY_A to the CAM blocks 235 selected by REQ_A and selectively routes CTR_B and KEY_B to the CAM blocks 235 selected by REQ_B.

Output switch matrix 550, which may be formed using well-known cross-bar circuits, multiplexers, and the like, includes a plurality of inputs each coupled to a corresponding one of CAM blocks 235(0)-235(n-1), a control terminal to receive BLK_SEL, a first output to provide IDX_A to output interface 240A, and a second output to provide IDX_B to output interface 240B.

An exemplary operation of control logic 500 is as follows. For the exemplary embodiment of FIG. 5, each packet from THD_A is associated with a context number (CN_A), and each packet from THD_B is associated with a context number (CN_B). First, input interface 210A receives THD_A, and in response thereto forwards INST_A and KEY_A to memory 520A, and forwards REQ_A and CN_A to arbiter 530. Similarly, input interface 210B receives THD_B, and in response thereto forwards INST_B and KEY_B to memory 520B, and forwards REQ_B and CN_B to arbiter 530. Arbiter 530 asserts WR_A to store INST_A and KEY_A in a storage location of memory 520A addressed by CN_A, and asserts WR_B to store INST_B and KEY_B in a storage location of memory 520B addressed by CN_B.

Arbiter 530 determines whether REQ_A and REQ_B select any of the same CAM blocks 235 for their respective compare operations, for example, in the manner described above. If REQ_A and REQ_B do not select any of the same CAM blocks 235, then arbiter 530 schedules their respective compare operations for concurrent execution in CAM core 230. More specifically, arbiter 530 simultaneously asserts RD_A and RD_B. The asserted state of RD_A causes memory 520A to access the storage location addressed by CN_A, and to forward INST_A to instruction decoder 525A and to forward KEY_A to input switch matrix 540. The asserted state of RD_B causes memory 520B to access the storage location addressed by CN_B, and to forward INST_B to instruction decoder 525B and to forward KEY_B to input switch matrix 540. Instruction decoder 525A decodes INST_A to generate CTR_A, and instruction decoder 525B decodes INST_B to generate CTR_B, which are simultaneously forwarded to input switch matrix 540. Concurrently, arbiter 530 generates a value of BLK_SEL that causes input switch matrix 540 to simultaneously route CTR_A/KEY_A to the CAM blocks 235 selected by REQ_A and route CTR_B/KEY_B to the CAM blocks 235 selected by REQ_B.

Next, CTR_A initiates a first compare operation between KEY_A and data stored in the first group of CAM blocks 235 selected by REQ_A to generate IDX_A, and CTR_B simultaneously initiates a second compare operation between KEY_B and data stored in the second group of CAM blocks 235 selected by REQ_B to generate IDX_B. Thereafter, output interface 240A may use IDX_A as an address to retrieve DOUT_A from associated memory 123, and output interface 240B may use IDX_B as an address to retrieve DOUT_B from associated memory 123.

Conversely, if REQ_A and REQ_B select one or more of the same CAM blocks 235 for their respective compare operations, then arbiter 530 schedules their respective compare operations for sequential execution in CAM core 230. For the present example, arbiter 530 schedules the compare operation requested by REQ_A to be processed first, and schedules the compare operation requested by REQ_B to be processed second. Thus, for the present example, arbiter 530 first asserts RD_A and de-asserts RD_B. The de-asserted state of RD_B prevents memory 520B from outputting data, and the asserted state of RD_A causes memory 520A to access its storage location addressed by CN_A, and thus forward INST_A to instruction decoder 525A and forward KEY_A to input switch matrix 540. Instruction decoder 525A decodes INST_A to generate CTR_A, which is forwarded to input switch matrix 540. Concurrently, arbiter 530 generates a first value of BLK_SEL that causes input switch matrix 540 to route CTR_A and KEY_A to the CAM blocks 235 selected by REQ_A. CTR_A initiates a first compare operation between KEY_A and data stored in the CAM blocks 235 selected by REQ_A to generate IDX_A, and thereafter output interface 240A may use IDX_A as an address to retrieve DOUT_A from associated memory 123.

Then, arbiter 530 asserts RD_B and de-asserts RD_A. The de-asserted state of RD_A prevents memory 520A from outputting data, and the asserted state of RD_B causes memory 520B to access its storage location addressed by CN_B, and thus forward INST_B to instruction decoder 525B and forward KEY_B to input switch matrix 540. Instruction decoder 525B decodes INST_B to generate CTR_B, which is forwarded to input switch matrix 540. Concurrently, arbiter 530 generates a second value of BLK_SEL that causes input switch matrix 540 to route CTR_B and KEY_B to the CAM blocks selected by REQ_B. CTR_B initiates a second compare operation between KEY_B and data stored in the CAM blocks 235 selected by REQ_B to generate IDX_B, and thereafter output interface 240B may use IDX_B as an address to retrieve DOUT_B from associated memory 123.

Thus, as explained above, if first and second compare operations (e.g., requested by REQ_A and REQ_B, respectively) do not select any of the same blocks 235, control logic 500 may schedule the first and second compare operations for simultaneous (e.g., parallel) execution in dual pipelines of CAM core 230, thereby improving the through-put of CAM device 500 over prior CAM devices that perform only one compare operation at a time and increasing flexibility over prior CAM devices that dedicate a specified portion of the CAM array to each pipeline. Otherwise, if one or more of the same CAM arrays are selected for participation in both the first and second compare operations, then arbiter 530 schedules the first and second compare operations for sequential execution in CAM core 230.

Although the exemplary embodiment of FIG. 5 shows arbiter 530 as providing the same block select signal (BLK_SEL) to input switch matrix 540 and to output switch matrix 550, for other embodiments, arbiter 530 may provide separate block select signals to input switch matrix 540 and to output switch matrix 550. In this manner, the results of compare operations requested by REQ_A may be output via either first output interface 240A or second output interface 240B, and the results of compare operations requested by REQ_B may be output via either first output interface 240A or second output interface 240B.

Further, although shown described above and illustrated in the accompanying figures as receiving threads THD_A and THD_B from separate input interfaces 210A-210B, for other embodiments, CAM device 200 may receive THD_A and THD_B from the same input interface.

For other embodiments, CAM device 200 may include a re-entrant processor that is capable of initiating a series of related compare operations in the CAM core without receiving additional commands from the network processor, which as explained below may not only reduce the processing time of the network processor but may also reduce the internal bandwidth requirements between the network processor and the CAM device when the CAM device is performing a series of related compare operations. For such embodiments, the re-entrant processor may be configured to selectively modify the search key to construct a new search key using data such as search keys and/or search results from one or more previous search operations, and may also be configured to initiate a series of subsequent compare operations between one or more newly constructed keys and data stored in selected CAM arrays of the CAM core without receiving additional search keys or instructions from the network processor. In this manner, embodiments of the present invention may perform a series of related compare operations in the CAM core without utilizing any execution cycles of the network processor and without consuming any bandwidth of the signal line interconnections between the network processor and the CAM device.

Figure 6A:
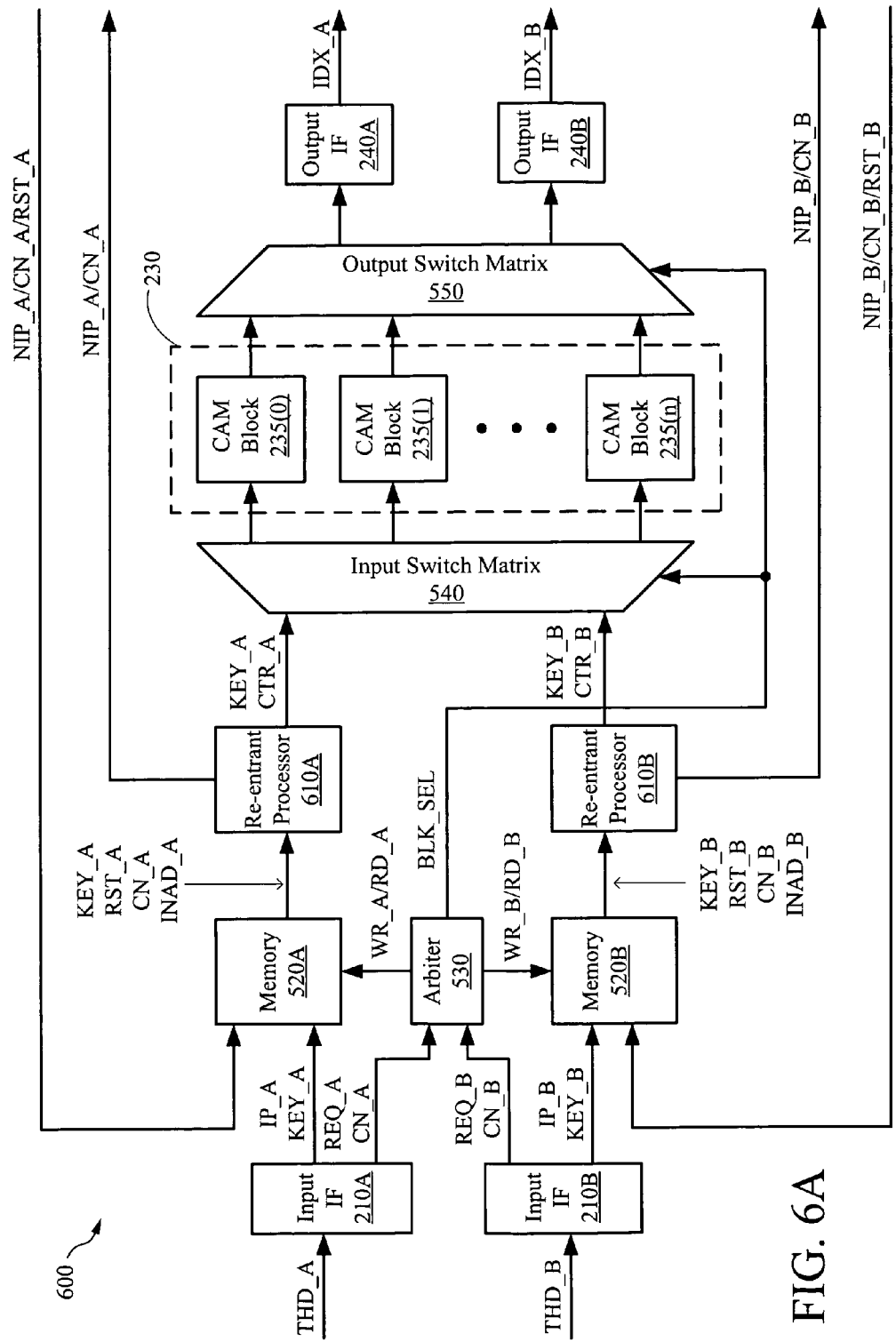
FIG. 6A is a functional block diagram of a CAM device in accordance with other embodiments of the present invention.

For example, FIG. 6A shows a simplified functional block diagram of a CAM device 600 in accordance with another embodiment of the present invention. CAM device 600, which for some embodiments may include all the functional elements of CAM device 500 of FIG. 5, also includes re-entrant processors 610A and 610B. As shown in FIG. 6A, re-entrant processor 610A includes an input to receive KEY_A, results (RST_A) from one or more previous compare operations associated with THD_A, CN_A, and an instruction address (INAD_A) from memory 520A, includes a first output to provide KEY_A and CTR_A to CAM core 230 via input switch matrix 540, and includes a second output to provide a next instruction pointer (NIP_A) and CN_A to the CAM core's first execution pipeline. Similarly, re-entrant processor 610B includes an input to receive KEY_B, results (RST_B) from one or more previous compare operations associated with THD_B, CN_B, and an instruction address (INAD_B) from memory 520B, includes a first output to provide KEY_B and CTR_B to CAM core 230 via input switch matrix 540, and includes a second output to provide a next instruction pointer (NIP_B) and CN_B to the CAM core's second execution pipeline. RST_A may include IDX_A and/or DOUT_A values from one or more previous compare operations associated with THD_A, and RST_B may include IDX_B and/or DOUT_B values from one or more previous compare operations associated with THD_B. For simplicity, associated memory device 123 is not shown in FIG. 6A.

Further, memory 520A includes a second input to receive NIP_A, CN_A, and RST_A from the CAM core's first execution pipeline. Similarly, memory 520B includes a second input to receive NIP_B, CN_B, and RST_B from the CAM core's second execution pipeline. As described above with respect to FIG. 5, each memory 520 includes a plurality of storage locations each for storing key, result, and instruction information associated with a particular context for the corresponding thread. The context number (CN) may be used as a write address to write key, result, and/or instruction information for a particular context to a corresponding location of memory 520. For other embodiments, memories 520A and 520B may be the same memory.

Figure 6B:
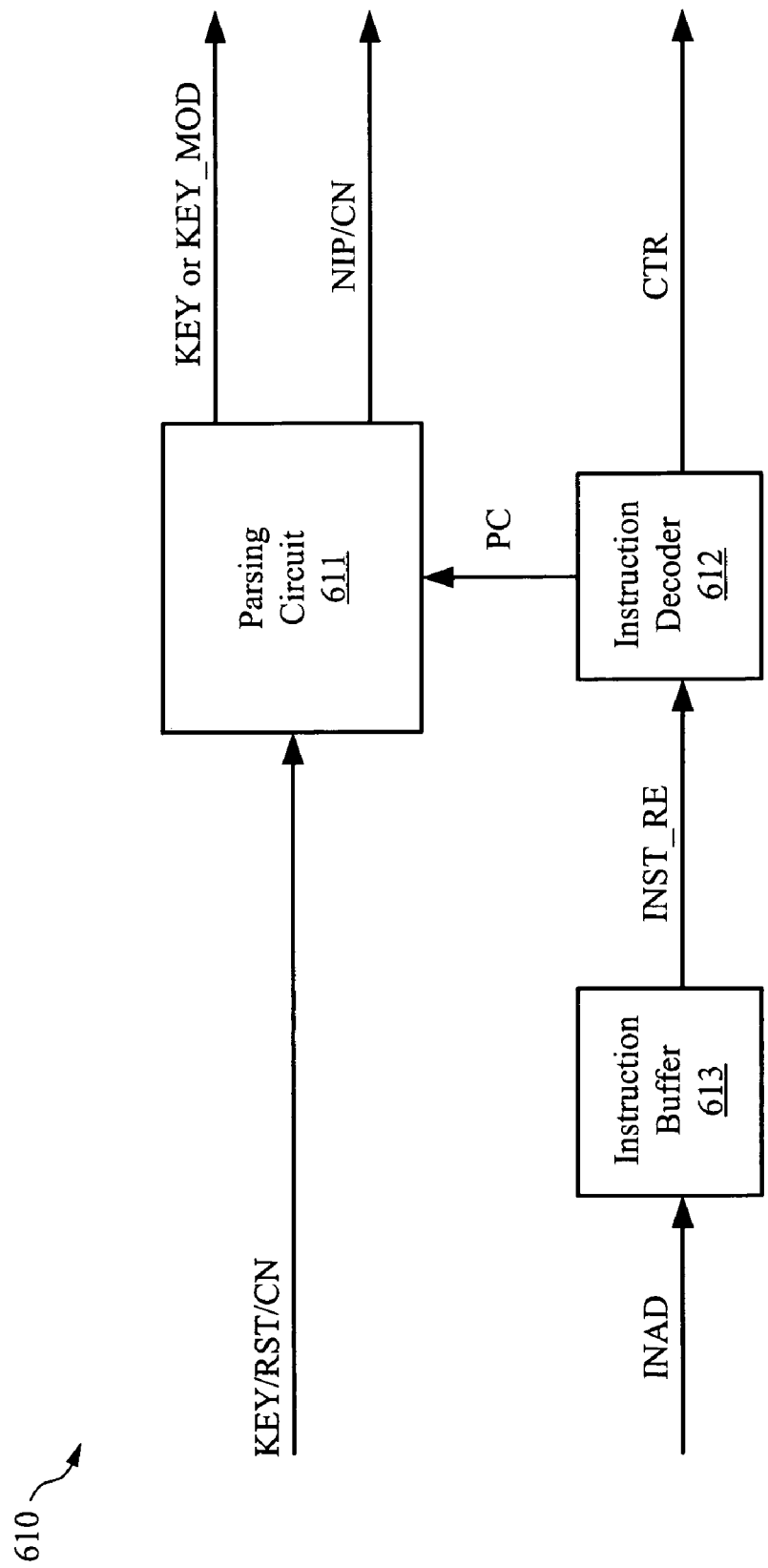
FIG. 6B is a simplified functional block diagram of the re-entrant processor for one embodiment of the CAM device of FIG. 6B.

Referring also to FIG. 6B, each re-entrant processor 610 includes a parsing circuit 611, an instruction decoder 612, and an instruction buffer 613. Instruction buffer 613, which may be implemented using well-known buffer architectures, includes a plurality of addressable storage locations for storing a corresponding plurality of re-entrant instructions (INST_RE). Each re-entrant instruction, which may be pre-loaded into instruction buffer 613 (e.g., by a network administrator or user), includes a first portion containing well-known commands (e.g., CTR) for initiating a compare operation in CAM core 230, a second portion containing key construction data that defines how a modified (e.g., re-entrant) search key (KEY_MOD) is to be constructed using information from one or more previous compare operations, and a third portion containing a value of NIP that either references another re-entrant instruction or signals termination of the corresponding sequence of re-entrant compare operations. For some embodiments, the information from previous compare operations may include search keys (KEY) and/or search results (RST). Further, for some embodiments, NIP may be set to a predetermined termination value to indicate termination of the corresponding re-entrant sequence.

Instruction decoder 612, which is well-known, includes a first port coupled to instruction buffer 613 and includes a second port coupled to parsing circuit 611. Instruction decoder 612 is configured to decode re-entrant instructions (INST_RE) received from instruction buffer 613 to generate corresponding control signals (PC) for parsing circuit 611 and to generate compare control signals (CTR) for CAM core 230.

Parsing circuit 611 is configured to construct KEY_MOD using portions of KEY and/or RST from one or more previous compare operations in response to key construction data provided by a corresponding re-entrant instruction (INST_RE). For some embodiments, parsing circuit 611 receives KEY and RST from a storage location in the corresponding memory 520 addressed by CN. Further, although not shown in FIG. 6B for simplicity, parsing circuit 611 may include buffers to store KEY and RST associated with one or more previous compare operations for the corresponding thread.

An exemplary operation of CAM device 600 for performing a re-entrant sequence of compare operations is described below with respect to re-entrant processor 610A and the CAM core's first execution pipeline. However, the description below is equally applicable to the operation of re-entrant processor 610B for performing a series of related compare operations associated with THD_B in the CAM core's second execution pipeline. Further, for simplicity, operation of arbiter 530 in scheduling compare operations associated with requests received from threads THD_A and THD_B is omitted in the following illustrative example, with the following description focusing on THD_A.

First, a request (REQ_A) associated with THD_A is received from network processor 110 via input interface 210A, along with a corresponding search key (KEY_A), instruction pointer (IP_A), and context number (CN_A). REQ_A and CN_A are forwarded to arbiter 530, which asserts WR_A to store IP_A and KEY_A in the storage location of memory 520A addressed by CN_A. For the present example, the results (RST_A) of one or more previous compare operations associated with CN_A are already stored in the storage location of memory 520A that is addressed by CN_A. Then, arbiter 530 asserts RD_A, which causes memory 520A to forward KEY_A, RST_A, CN_A, and IP_A (as INAD_A) to re-entrant processor 610A. More specifically, KEY_A, RST_A, and CN_A are routed to parsing circuit 611, and INAD_A is routed to instruction buffer 613. Instruction buffer 613 outputs the instruction (e.g., INST_RE1) addressed by INAD_A to instruction decoder 612, which decodes the instruction to generate CTR and PC. CTR, which initiates a compare operation with data stored in the CAM arrays selected by REQ_A, is provided to CAM core 230. PC, which defines if and how KEY_A is to be modified to generate KEY_MOD, is provided to parsing circuit 611. In response to PC, parsing circuit 611 selectively modifies KEY_A using KEY and RST information from previous compare operations to generate KEY_MOD, and then provides KEY_A or KEY_MOD to CAM core 230. Parsing circuit 611 also provides NIP_A and CN_A to the CAM core's first execution pipeline. Then, the compare operation between KEY_A and data stored in the group of CAM blocks 235 selected by REQ_A generates IDX_A, which in turn is used to retrieve DOUT_A from associated memory 123. IDX_A and DOUT_A are then used to update the value of RST_A stored in the storage location of memory 520B addressed by CN_A.

Re-entrant processor 610A then determines whether the instruction (e.g., INST_RE1) references another instruction stored in instruction buffer 613, for example, by comparing the NIP_A value to a predetermined termination value. If NIP_A is set to the termination value, CAM device 600 may remain idle until a subsequent request, instruction pointer, and search key are received from the network processor.

Conversely, if NIP_A is not set to the termination value, re-entrant processor 610A may initiate a series of subsequent compare operations without receiving additional data and/or instructions from the network processor. More specifically, the instruction pointer (IP) stored in the storage location of memory 520A addressed by CN_A is updated with the value of NIP_A received from the first execution pipeline during a write operation initiated by asserting WR_A. Then, arbiter 530 provides CN_A as a read address to memory 520A and asserts RD_A, which causes memory 520A to forward KEY_A, RST_A, CN_A, and NIP_A (as INAD_A) to re-entrant processor 610A. Within re-entrant processor 610A, instruction buffer 613 outputs the instruction (e.g., INST_RE2) addressed by INAD_A to instruction decoder 612, which decodes the instruction to generate CTR and PC. CTR, which initiates a compare operation with data stored in the CAM arrays selected by REQ_A, is provided to CAM core 230. PC, which defines if and how KEY_A is to be modified to generate KEY_MOD, is provided to parsing circuit 611. In response to PC, parsing circuit 611 selectively modifies KEY_A using KEY and RST information from previous compare operations to generate KEY_MOD, and then provides KEY_A or KEY_MOD to CAM core 230. Parsing circuit 611 also provides NIP_A and CN_A to the CAM core's first execution pipeline. Then, the compare operation between KEY_A and data stored in the group of CAM blocks 235 selected by REQ_A generates IDX_A, which in turn is used to retrieve DOUT_A from associated memory 123. IDX_A and DOUT_A are routed to and stored in the storage location of memory 520B addressed by CN_A as RSTS_A.

This process may continue to execute any number of related compare operations in CAM core 230 using newly-constructed search keys without receiving additional instructions or additional search keys from network processor 110, for example, until NIP_A does not reference other re-entrant instructions stored in instruction buffer 613 and/or until NIP_A is set to the termination value.

A more detailed description of the architecture and operation of various embodiments of re-entrant processors 610A and 610B may be found in co-pending and commonly owned U.S. patent application Ser. No. 11/298,206 entitled "Re-Entrant Processing In A Content Addressable Memory" and filed on Dec. 8, 2005, the entirety of which is incorporated by reference herein.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention.

What is claimed is:

1. A multi-pipelined content addressable memory (CAM) device, comprising:
a first thread comprising a first search key and a first request;
a second thread comprising a second search key and a second request; a CAM core including a plurality of CAM blocks, each CAM block including an individually searchable array of CAM cells; and
control logic having a first input to receive the first thread, a second input to receive the second thread, and outputs coupled to the CAM blocks, the control logic configured to selectively enable simultaneous execution of first and second compare operations, wherein the first compare operation compares the first search key and data stored in a first number of CAM blocks selected by the first request, and the second compare operation compares the second search key and data stored in a second number of CAM blocks selected by the second request, wherein the control logic comprises:
a first memory for storing the first search key and an associated first instruction;
a second memory for storing the second search key and an associated second instruction;
an arbiter having inputs to receive the first and second requests, having a first output to provide read and write control signals to the first memory, having a second output to provide read and write control signals to the second memory, and having a third output to generate a block select signal; and
an input switch matrix having a first input to receive the first search key, a second input to receive the second search key, a plurality of outputs each coupled to a corresponding CAM block, and a control terminal to receive the block select signal.

2. The CAM device of claim 1, wherein each request comprises a number of block select bits each indicating whether a corresponding CAM block is selected to participate in the compare operation associated with the request.

3. The CAM device of claim 1, wherein each of the first and second requests may select any of the CAM blocks in the CAM core.

4. The CAM device of claim 1, wherein the control logic compares the first and second requests to determine whether the first and second requests select any of the same CAM blocks.

5. The CAM device of claim 4, wherein if the first and second requests do not select any of the same CAM blocks, then the control logic schedules the first and second compare operations for simultaneous execution in the CAM core.

6. The CAM device of claim 5, wherein if the first and second requests select one or more of the same CAM blocks, then the control logic schedules the first and second compare operations for sequential execution in the CAM core according to an arbitration technique.

7. The CAM device of claim 6, wherein the arbitration technique comprises a round-robin scheme.

8. The CAM device of claim 6, wherein the arbitration technique comprises achieving a desired relationship between a bandwidth metric associated with the first thread and a bandwidth metric associated with the second thread.

9. The CAM device of claim 1, further comprising:
a first input interface for receiving the first thread; and
a second input interface for receiving the second thread.

10. The CAM device of claim 1, further comprising:
a first execution pipeline for processing the first thread; and
a second execution pipeline for processing the second thread independently of the first thread.

11. The CAM device of claim 1, wherein the control logic further comprises:
a first instruction decoder having an input to receive the first instruction from the first memory and having an output to provide first decoded control signals to the first input of the input switch matrix; and a second instruction decoder having an input to receive the second instruction from the second memory and having an output to provide second decoded control signals to the second input of the input switch matrix.

12. The CAM device of claim 1, wherein if the first and second requests do not select any of the same CAM blocks:
the control logic simultaneously asserts first and second read signals, wherein the first read signal causes the first memory to output the first instruction for decoding to generate first control signals that initiate the first compare operation in the CAM core, and the second read signal causes the second memory to output the second instruction for decoding to generate second control signals that initiate the second compare operation in the CAM core; and
the control logic asserts the block select signal to a value that causes the input switch matrix to simultaneously route the first search key and the first control signals only to the CAM blocks selected by the first request and route the second search key and the second control signals only to the CAM blocks selected by the second request, thereby scheduling the first and second compare operations for simultaneous execution in the CAM core.

13. The CAM device of claim 1, wherein if the first and second requests select one or more of the same CAM blocks:
the control logic asserts a first read signal to cause the first memory to output the first instruction for decoding to generate first control signals that initiate the first compare operation in the CAM core, and de-asserts a second read signal provided to the second memory;
the control logic asserts the block select signal to a first value to cause the input switch matrix to route the first search key and the first control signals only to the CAM blocks selected by the first request;
the control logic asserts the second read signal to cause the second memory to output the second instruction for decoding to generate second control signals that initiate the second compare operation in the CAM core, and de-asserts the first read signal; and
the control logic asserts the block select signal to a second value to cause the input switch matrix to route the second search key and the second control signals only to the CAM blocks selected by the second request, thereby scheduling the first and second compare operations for sequential execution in the CAM core.

14. The CAM device of claim 1, further comprising:
an output switch matrix having a plurality of inputs each coupled to a corresponding CAM block, a control terminal to receive the block select signal, a first output to provide results of the first compare operation, and a second output to provide results of the second compare operation.

15. The CAM device of claim 1, further comprising:
a re-entrant processor coupled between the first memory and the CAM core.

16. The CAM device of claim 15, wherein the re-entrant processor is configured to selectively modify the first search key by replacing selected portions of the first search key with selected portions of one or more previous search keys and/or previous search results associated with the first thread.

17. The CAM device of claim 16, wherein the re-entrant processor is further configured to initiate a series of subsequent compare operations between a number of modified search keys and data stored in the CAM arrays without receiving additional instructions or additional search keys from an external network processor coupled to the CAM device.

\* \* \* \* \*